United States Patent [19]

Yamamitsu

[11] 4,356,506

[45] Oct. 26, 1982

[54] AUTOMATIC CHROMINANCE CONTROL CIRCUIT FOR A COLOR VIDEO TAPE RECORDER

[75] Inventor: Chojuro Yamamitsu, Kawanishi, Japan

[73] Assignee: Matsushita Electric Industrial Co. Ltd., Osaka, Japan

[21] Appl. No.: 158,729

[22] Filed: Jun. 12, 1980

[30] Foreign Application Priority Data

Jun. 18, 1979 [JP] Japan ............................ 54-77415
Jun. 25, 1980 [JP] Japan ............................ 55-22537

[51] Int. Cl.³ ............................................ H04N 5/79
[52] U.S. Cl. .................................. 358/316; 358/40; 307/350
[58] Field of Search ............... 358/4, 8, 19, 27, 36, 358/40; 307/350, 351, 364

[56] References Cited

U.S. PATENT DOCUMENTS

| | | | |
|---|---|---|---|
| 3,764,734 | 10/1973 | Srivastava et al. | 358/27 |
| 3,943,560 | 3/1976 | Freestone | 358/27 |
| 3,947,871 | 3/1976 | Amari et al. | 358/8 |
| 3,967,313 | 6/1976 | Miyamoto | 358/27 |
| 4,007,485 | 2/1977 | Sato | 358/40 X |
| 4,068,256 | 1/1978 | Tsuchiya et al. | 358/8 X |
| 4,068,257 | 1/1978 | Hirota et al. | 358/4 |
| 4,106,054 | 8/1978 | Tzakis | 358/27 |

Primary Examiner—Stuart N. Hecker
Attorney, Agent, or Firm—Burgess, Ryan and Wayne

[57] ABSTRACT

In a color video signal recording and reproducing apparatus of the type in which the color video signal is separated into the luminance signal and the composite carrier color signal; the separated composite carrier color signal is shifted in frequency; and the frequency-shifted composite carrier color signal and the separated luminance signal are processed for recording, the apparatus including a variable gain control means for controlling gain of the reproduced composite carrier color signal, and a system for generating the control signal for controlling the gain of the variable gain control means, the system having a means for detecting the amplitude of the composite carrier color signal, a means for generating the control signal in response to the output from the detecting means and a means for maintaining the amplitude of the control signal at a predetermined level.

8 Claims, 18 Drawing Figures

FIG. 1

PRIOR ART

AUTOMATIC CHROMINANCE CONTROL CIRCUIT FOR A COLOR VIDEO TAPE RECORDER

BACKGROUND OF THE INVENTION

The present invention relates to a color video signal recording and reproducing apparatus.

In a prior art color video signal recording system, the input color video signal is applied to both a low pass filter and a band pass filter so that it is separated into the luminance signal and the composite color signal. The separated luminance signal is subjected to the angle modulation such as frequency modulation and the frequency modulated-luminance signal is applied to a multiplexer or adder. Meanwhile the separated composite color signal passes through an automatic chroma control circuit so that the composite carrier color signal is maintained at a predetermined level. Thereafter the composite carrier color signal is shifted in frequency, in general, to a low frequency range, and the frequency-shifted composite carrier color signal passes through a low pass filter so that the composite color signal whose frequency is shifted to a lower frequency range is derived. The frequency-shifted composite carrier color signal is then added to the frequency-modulated luminance signal and the multiplexed signal is recorded on a recording medium such as a tape through a video head.

In reproduction, the signal reproduced from the recording tape or the like is separated into the frequency-modulated luminance signal and the frequency-shifted composite signal. The frequency-modulated luminance signal passes through an amplitude limiter and a demodulator so that the luminance signal is reproduced. The frequency-shifted composite carrier color signal passes through an automatic chroma control circuit and a frequency shifter or converter so that the composite color signal is restored. The reproduced luminance and composite carrier color signals are multiplexed or added to obtain the color video signal. In the process of restoring to the original frequency of the composite carrier color signal, the variations in time axis of the color signal are eliminated. Furthermore, the gain of the automatic chroma control circuit is controlled in response to the output from a circuit for detecting the amplitude of the burst in the reproduced composite carrier color signal.

The color video signal recording and reproducing apparatus of the type described above has some problems that the reproduced output is small and the signal-to-noise ratio S/N is adversely affected at low amplitudes at which equipment noise and impedance noise are not negligible. In addition, in the range in which the amplitude of the carrier color signal is small, the amplitude of side bands of the frequency-modulated luminance signal which remain in the color signal band are very close to the amplitude of the carrier color signal to be recorded. Furthermore, the signal-to-noise ratio S/N of the reproduced color signal considerably drops in the case of high density recording utilizing short wavelengths and narrow tracks.

OBJECTS OF THE INVENTION

In view of the above, one of the objects of the present invention is to provide a color video signal recording and reproducing apparatus in which the recording level is varied in response to the contents of the composite carrier color signal so that the amplitude of the composite carrier color signal to be recorded approaches as closely as possible the amplitude of the carrier color signal of the color bar signal having a higher degree of saturation, whereby the composite carrier color signal can be recoded on a tape or the like at a high level and consequently in the reproduction the signal-to-noise ratio of the composite carrier color signal can be remarkably improved.

Another object of the present invention is to provide a color video signal recording and reproducing apparatus which can reduce the cross color between the reproduced luminance and composite color signals due to the decrease in ratio of the amplitude of the side bands of the angle-modulated luminance signal as compared with the amplitude of the composite carrier color signal which is shifted to a low frequency range in order to record the composite color signal at as high a level as possible.

A further object of the present invention is to provide a color video signal recording and reproducing apparatus which can remarkably improve the signal-to-noise ratio of the composite carrier color signal in the case of the reproduction so that high density recording utilizing short wavelengths and/or extremely narrow tracks can be attained.

BRIEF DESCRIPTION OF THE DRAWINGS

Same reference numerals are used to designate similar parts throughout the figures.

DETAILED DESCRIPTION OF THE INVENTION

Prior Art

Figure 1:
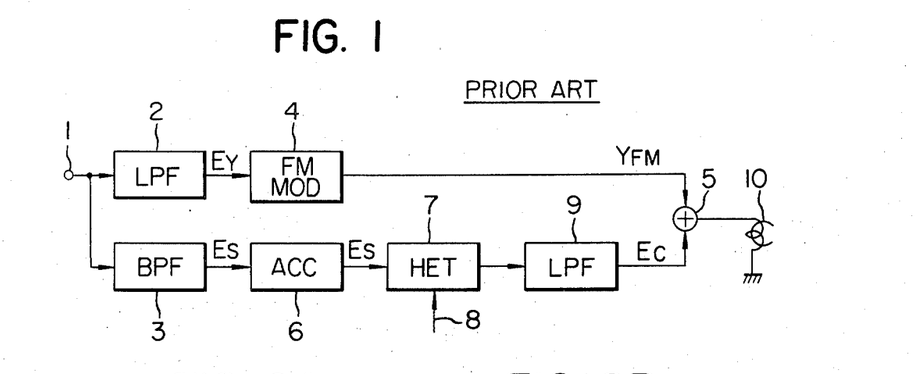
FIG. 1 is a block diagram of prior art color video signal recording and reproducing system of the type in which the composite color signal is shifted to a lower frequency range for recording.
Figure 2A:
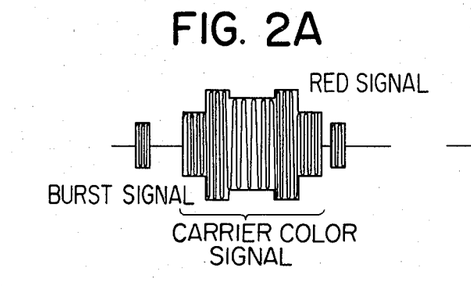
FIG. 2A shows the waveform used for the explanation of the definition of the term "composite carrier color signal" used in this specification.

In FIG. 1 is shown in block diagram a typical color video signal recording system. The color video signal which is applied to an input terminal 1 is applied to both a low pass filter 2 and a band pass filter 3 so as to be separated into the luminance signal $E_Y$ and the composite carrier color signal $E_s$. For the sake of better understanding of the present invention, the composite color signal $E_s$ is defined as consisting of the burst signal and the carrier color signal as shown in FIG. 2A.

The separated luminance signal $E_Y$ is angle modulated or frequency modulated in this case by a modulator 4 into $Y_{FM}$ signal which in turn is applied to an adder or multiplexer 5. The separated composite carrier color signal $E_s$ is applied to an automatic chroma control circuit ACC 6 which maintains the level of the composite carrier color signal at a constant value, and the output from the automatic chroma control circuit 6 is frequency converted with a continuous wave 8 in a frequency converter 7 and applied to a low pass filter 9, whereby the color composite signal $E_c$ at low frequencies is obtained. The composite signal $E_c$ is mixed with the luminance signal $Y_{FM}$ and the multiplexed signal is recorded by a video recording head 10 on a recording medium such as a tape (not shown).

In the reproduction, the reproduced signal is separated into the $Y_{FM}$ signal and the composite carrier color signal $E_c$. The $Y_{FM}$ signal is applied to an amplitude limiter so that the signal peaks are prevented from exceeding a predetermined level. Thereafter the luminance signal $Y_{FM}$ is angularly demodulated into the luminance signal $E_Y$. The reproduced signal $E_c$ is first applied to an automatic chroma control circuit so that the amplitude is maintained at a predetermined level. Thereafter the signal is frequency converted into the composite carrier color signal $E_s$. The reproduced luminance and composite color signals are multiplexed into the color video signal. In the reproduction process, the variations in time axis of the color signal are eliminated in the frequency conversion and the automatic chroma control circuit is controlled in response to the signal obtained by the amplitude detection of the burst signal in the original color composite signal $E_s$.

Figure 3:
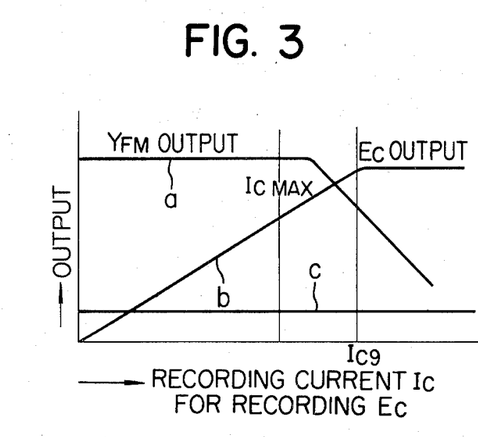
FIG. 3 is a graph used for the explanation of the setting of the recording current for recording the composite carrier color signal.

In the recording and reproducing system of the type described, in order to record the $Y_{FM}$ signal, the optimum recording current $Y_{TPY}$ is applied to the video head 10. FIG. 3 shows the reproduced output when the recording current $I_c$ for recording the composite carrier color signal $E_c$ is changed. The curve (a) shows the reproduced output of $Y_{FM}$ signal; the curve (b), the reproduced output of $E_c$ signal; and the curve (c), the noise level of a reproduction peamplifier and impedance. These curves show that the higher the current $I_c$, the higher the output of $E_c$ signal becomes. The signal-to-noise ratio S/N of the reproduced color signal is improved in proportion to the square root of the recording current $I_c$ when the output is in excess of the noise level (c) according to the experimental results. When the recording current $I_c$ is increased, the output of the reproduced $Y_{FM}$ signal drops and the signal-to-noise ratio S/N also drops. When the recording current $I_c$ is further increased, the output of the reproduced signal $E_c$ is saturated or the curve (b) becomes flat. In addition, even though not shown in FIG. 3, due to distortions of the third order in the electromagnetic conversion system, the intermodulation noise increases which causes beats in the reproduced luminance signal. Furthermore, as the recording current $I_c$ exceeds a certain level, the saturation of the reproduced output occurs as described above, resulting in the problems of Differential Gain and Differential Phase. In view of the above, the maximum recording current $I_{c\,max}$ is set at a point $-7$ to $-10$ dB lower than the point $I_{CS}$ at which the reproduced composite color signal is saturated. In other words, the ratio of the $I_{c\,max}$ to the optimum recording current $Y_{TPY}$ of $Y_{FM}$ signal is in general $$I_{c\,max}/Y_{TPY} = -10 \text{ to } -15 \text{ dB}$$

The $I_{c\,max}$ is adjusted with reference to the red signal which has the highest saturation in the color bar signal as shown in FIG. 2A because the color bar signal has the carrier color signal which has the widest amplitude.

Figure 2B:
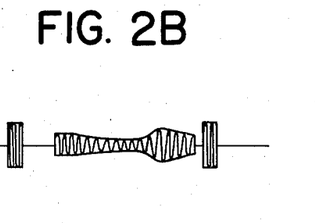
FIG. 2B shows a statistically typical waveform of the composite carrier color signal.

However, in general the carrier color signal of the composite carrier color signal $E_s$ of the color television signal or the camera signal is lower in amplitude than the burst signal as shown in FIG. 2B. Therefore, in the prior art system in which the automatic chroma control circuit 6 shown in FIG. 1 is controlled in response to the level of the burst extracted from the composite color signal $E_s$ so that the amplitude of the burst is maintained at a predetermined level, there is used the recording current range which, when time averaged, is by far smaller than the recording current $I_{c\,max}$ which corresponds to the amplitude of the red signal in the color bar signal as shown in FIGS. 2A and 2B. As a result, the reproduced output is small; the signal-to-noise ratio S/N of the reproduced composite color signal is low; and the signal-to-noise ratio S/N further becomes lower than that in proportion to the square root described above when the amplitude is so small that the equipment noise adversely affects the reproduction. In addition, in the region where the amplitude of the carrier color signal is small, the side bands of the $Y_{FM}$ signal which has been angle modulated at the high frequency range and remain in the color signal band and the amplitude of the carrier color signal are very close to each other so that an increase in cross color results.

In addition, the general tendency in the color video signal recording and reproducing system is toward high density recording by the use of the short waves and the tracks with small widths. Therefore, it follows that the higher the recording density, the more adversely the reproduced signal-to-noise ratio is affected.

The Invention

First Embodiment

Figure 5:
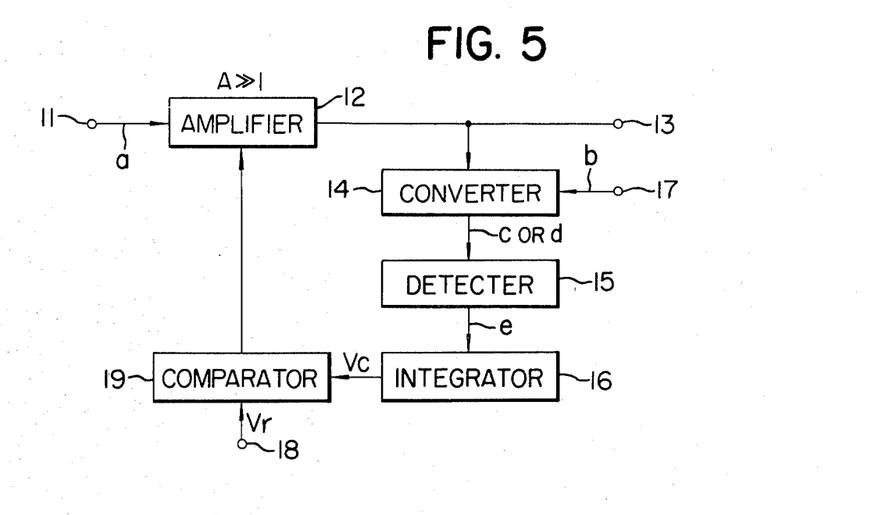
FIG. 5 is a block diagram of a first embodiment of the present invention.

In FIG. 5 is shown in block diagram a first embodiment of the present invention in which an automatic chroma control circuit (See FIG. 1) includes a function of controlling the recording current for the composite carrier color signal in response to the variations in the burst and the carrier color signal.

The output $E_s$ from the band pass filter 3 (See FIG. 1) is impressed on an input terminal 11 and is amplified to a greater degree by an amplifier 12 with an amplification factor A which is by far greater than unity. The output from the amplifier 12 is applied to an output terminal 13 and a converter 14. The output terminal 13 is connected to the frequency converter 7 shown in FIG. 7. The gain of the amplifier is controlled by the control signal from a negative feedback circuit to be described below so that the gain is maintained at a predetermined level K.

Figure 6:
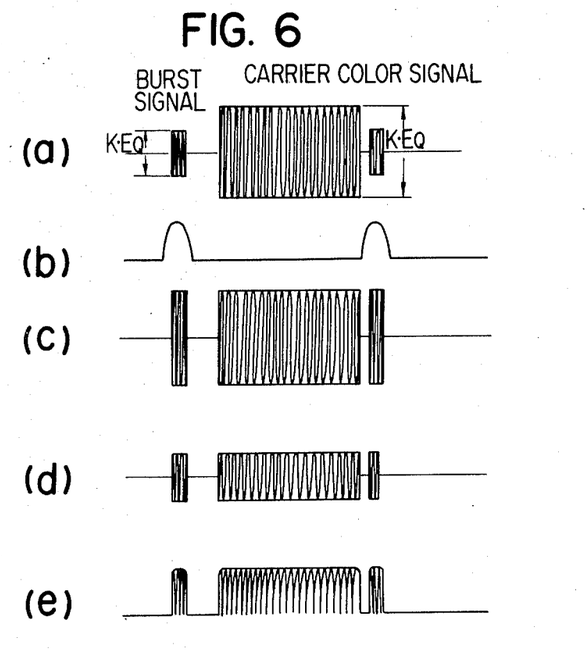
FIG. 6 shows waveforms used for the explanation of the mode of operation of the first embodiment.

The signal with the amplitude $K.E_s$ as shown at (a) in FIG. 6 is applied to the converter 14 while the signal as shown at (b) which rises to a high level for a period of the burst is applied to an input terminal 17. The signal (b) is derived by extracting only the horizontal sync signal from the composite sync signal and delaying by a predetermined time period the extracted horizontal sync signal or the composite sync signal. As a result, as shown at (c) in FIG. 6 the amplitude of the burst is increased by a suitable level of for example 6 to 10 dB. Alternatively, as shown at (d) in FIG. 6 the amplitude of the carrier color signal is suppressed as will be described in more detail below.

Assume that the composite carrier color signal $E_s$ applied to the amplifier 12 is represented by the amplitude $E_B$ of the burst signal and that $E_Q$ of the carrier color signal and they have a relationship of $E_Q/E_B=C$, which is, for example, 2, then the ratio of $E_Q$ to $E_B$ in the output becomes $K.E_Q/K.E_B=C$. That is, the ratio remains unchanged. However, the ratio in the output from the converter 14 becomes $K_Q/E_B=S$ which is smaller than C. For instance, as shown at (c) in FIG. 6, $E_B$ becomes $2E_B$ in the output from the converter 14 so that $S=1$.

After the $E_Q/E_B$ ratio has been varied in the manner described above, the output from the converter 14 is applied to an amplitude detector 15 for amplitude detection. For instance, the amplitude detector 15 is of the type which has diodes so as to affect the half-wave or full-wave rectification.

The output from the detector 15 is applied to an integrator 16 in which a time constant of discharge or charging is maintained at a predetermined level. The DC voltage $V_c$ derived from the integrator 16 is compared in a level comparator 19 with a reference voltage $V_r$ from a reference voltage source 18, and in response to the difference or error signal, the amplifier 12 is controlled.

The mode of operation of the first embodiment will be described in more detail with reference to the characteristic curves shown in FIG. 4. These characteristic curves show the relationship between the input level and the output level when the signal as shown at (a) in FIG. 6 is applied to the automatic chroma control circuit when the amplitude of the burst signal is maintained at a normal level while the amplitude of the carrier color signal is varied. The amplitude of the input carrier color signal is plotted along the abscissa while the amplitude of the output from the amplifier 12, along the ordinate. In the prior art system in which the automatic chroma control circuit is so controlled that the burst signal is maintained always at a predetermined level, the characteristic curve as shown at (f) in FIG. 4 is obtained which indicates that the output is in proportion to the amplitude of the input carrier color signal.

Figure 7:
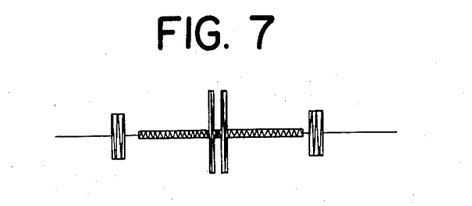
FIG. 7 shows the waveform used for the explanation of the problems encountered when an average type automatic chroma gain control circuit is used.

A closed loop consisting of the circuits shown in FIG. 5 except the converter 14, has been well known in the art as the peak or average type automatic gain control circuit (AGC) for maintaining the luminance signal at a predetermined level. The curve (d) shows the characteristic of an average type automatic chroma control circuit to which is applied to the above described AGC and in which the charging or discharging time constant of the integrator has a high value and a slow response. In this case, as compared with the characteristic curve (f), the amplitude of the small signal is increased considerably. As a result, the carrier color signal with the amplitude considerably lower than that of the burst signal continues for a considerably long time period as shown in FIG. 7. When the signals with a higher degree of saturation appears for a very short time period, the average of these signals after integration becomes low in amplitude level. As a result, the amplitude of the signal is raised. The signals with a higher degree of saturation which continues for a relative short period exceed far beyond the $I_{c\,max}$ shown in FIG. 3 so that the reproduced image is adversely affected by the intermodulation beats.

Figure 4:
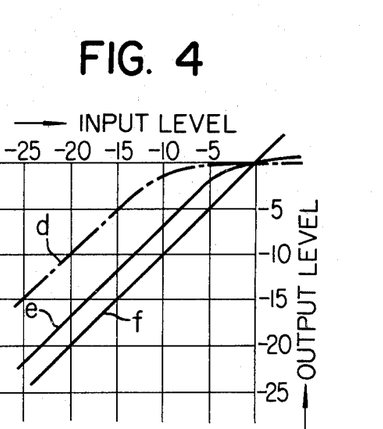
FIG. 4 is a graph used for the explanation of the characteristics of a first embodiment of the present invention.

In view of the above, according to the present invention, in the case of the detection of the composite carrier color signal in which the amplitudes of both the burst signal and the carrier color signal are detected, the amplitude of the burst signal is increased relatively so that the characteristic curve as indicated by (e) in FIG. 4 is obtained.

When the value of the amplitudes of the burst signal integrated for a predetermined time interval T for each periodic line becomes by far greater than the value of the amplitudes of the carrier color signal integrated for the same time period, only the amplitude of the burst signal affects the automatic chroma control. Therefore the characteristic curve (e) has substantially the same slope as the curve (f). The curve (e) becomes nonlinear at the region in which the integrated value of the carrier color signal cannot be neglected as compared with that of the burst signal.

The characteristic can be arbitrarily varied by changing the ratio in amplitude between the burst and the carrier color signal. That is, the higher the amplitude of the burst signal as compared with that of the carrier color signal, the more the characteristic curve (d) approaches to the curve (f). Therefore, any desired nonlinear characteristic curve can be obtained in a simple manner with any time constant. Furthermore, only the converter 14 which obtains $E_Q/E_B=S$ is inserted between the amplifier 12 and the amplitude detector 15 so that the signal passing from the input terminal 11 through the amplifier 12 to the output terminal 13 and to the frequency converter 7 in FIG. 1 is not adversely affected at all.

As described above, according to the present invention, the composite carrier color signal to be recorded is enhanced as indicated by the curve (e) in FIG. 4 as compared with the prior art burst detection type ACC whose characteristic curve is indicated by (f), so that the signal-to-noise ratio S/N of the reproduced composite signal can be remarkably improved. Regardless of the contents of the carrier color signal, the ratio $E_Q/E_B=S$ can be so determined that the peak of the carrier color signal is located at the point exceeding the $I_{c\,max}$ (See FIG. 3) by about 2 L to 3 dB.

The composite carrier color signal $E_s$ which is applied to the input terminal 11 can be directly applied to the converter 14. Alternatively, the output from the low pass filter 9 (See FIG. 1) can be also directly applied thereto.

The output from the automatic chroma control circuit 6 is transmitted through the frequency converter 7 and the low pass filter 9 to the adder 5 at which is superposed upon the luminance signal $Y_{FM}$ and recorded on the recording tape or the like.

Figure 8:
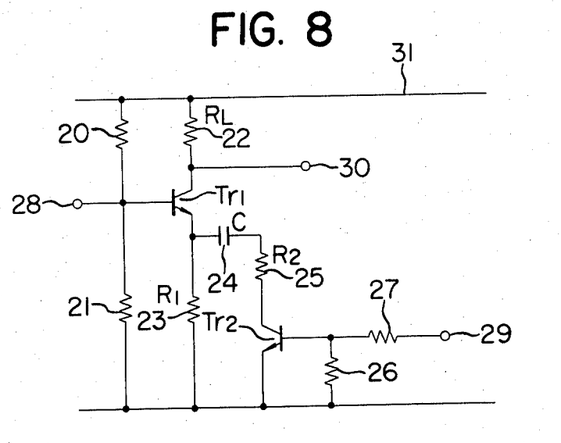
FIG. 8 is a detailed circuit diagram of a converter 14 shown in FIG. 5.

In FIG. 8 is shown in detail the converter 14 comprising a DC voltage source 31, transistors $Tr_1$ and $Tr_2$, bias resistors 20, 21, 22 and 23 for the transistor $Tr_1$ and bias resistors 25, 26 and 27 for the second transistor $Tr_2$. The signal as shown at (a) in FIG. 6 is applied to an input terminal 28 and is amplified by the transistor Tr with an amplification factor almost equal to $R_L/R_1$, and the amplified output is derived from an output terminal 30 which in turn is connected to the amplitude detector 15 (See FIG. 5). The signal as shown at (b) in FIG. 6 is applied to an input terminal 29 so that the transistor $Tr_2$ is enabled for a period equal to that of the burst signal, but remains disabled for a period of the carrier color signal. A capacitor 24 is inserted in order to block the DC component. The amplification factor when the transistor Tr is in the conduction state or during the period of the burst signal is dependent upon the values of the series circuit of resistors $R_1$ and $R_2$ and of the load resistor $R_L$. That is, the amplification factor is given by $$[R_L \cdot (R_1+R_2)]/R_1 R_2$$

while during the period of the carrier color signal is $R_L/R_1$ as described elsewhere.

As described above, the amplitudes of both the burst signal and the carrier color signal can be arbitrarily varied depending upon the values of the resistors $R_1$ and $R_2$.

In summary, according to the first embodiment, two important effects can be attained. The first effect is that even when the burst signal is maintained at a predetermined level in the ordinary case and when the composite carrier color signal is small for a predetermined time interval, it can be enhanced in the amplitude detection thereof consisting of the burst signal and the carrier color signal. The second effect resides in the fact that the ratio in amplitude between the burst signal and the carrier color signal can be varied to a desired value before the color composite signal is applied to the amplitude detector 15 so that any desired characteristic curve as shown in FIG. 6 which enhances the composite carrier color signal can be obtained even when the integration time constant is relatively long.

Second Embodiment

Figure 9:
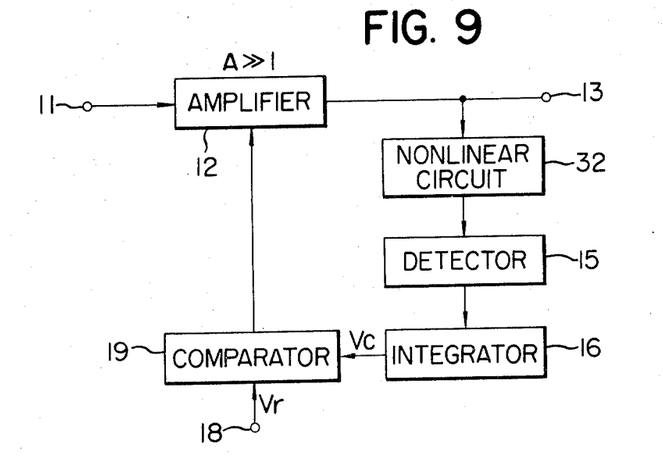
FIG. 9 is a block diagram of a second embodiment of the present invention.
Figure 10:
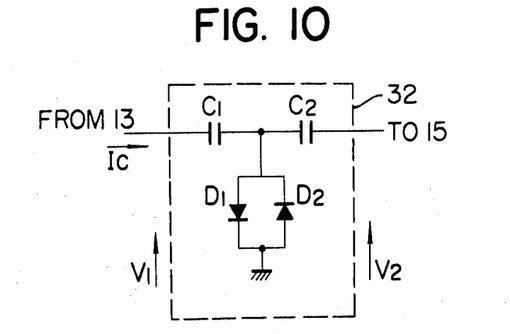
FIG. 10 is a detailed diagram of a nonlinear circuit 32 shown in FIG. 9.
Figure 11A:
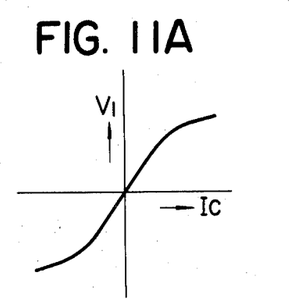
FIGS. 11A and 11B show the characteristic curves thereof.
Figure 11B:
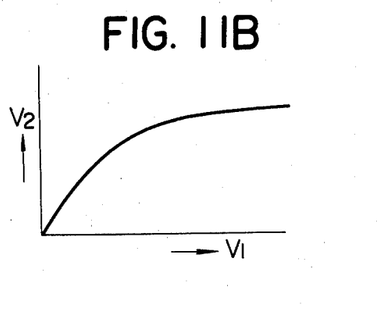

In FIG. 9 is shown a second embodiment of the present invention. The output from the amplifier 12 is applied not only to the output terminal 13 but also to a non-linear circuit 32, the most simple example of which is shown in FIG. 10 as consisting of diodes $D_1$ and $D_2$ which in turn constitute a limiter having the nonlinear characteristic curve as shown in FIG. 11 A. The input voltage $V_1$ vs. output voltage $V_2$ characteristic curve is also nonlinear as shown in FIG. 11B. A resistor (not shown) is connected between the signal source and a capacitor $C_1$. The output from the nonlinear circuit 32 is detected by the amplitude detector 15. The output from the detector 15 is applied to the integrator 16 with a predetermined charging or discharging time constant so that the substantially direct current voltage $V_c$ is derived. The output voltage $V_c$ is compared with the reference voltage $V_r$ in the level comparator 19 and in response to the difference or error signal the gain of the amplifier 12 is controlled as described elsewhere in conjunction with the first embodiment.

Figure 12:
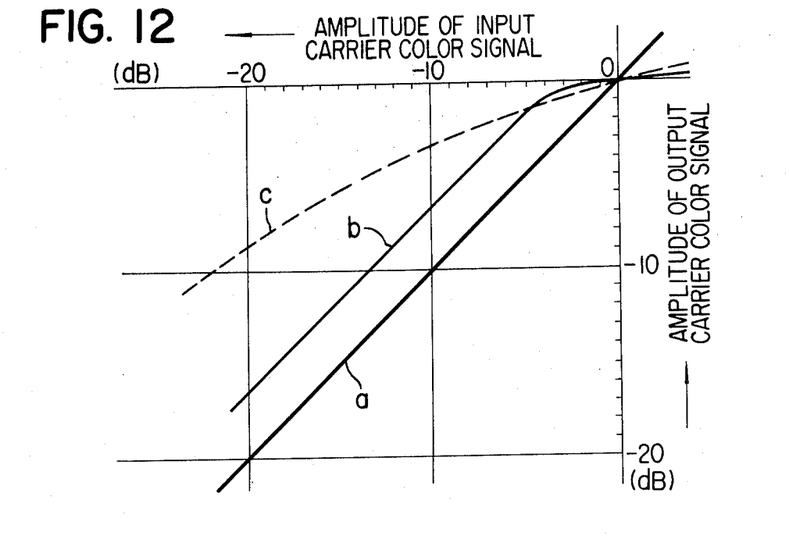
FIG. 12 is a graph used for the explanation of the characteristics of the second embodiment shown in FIG. 9.

The effects of the second embodiment can be best understood from the characteristic curves shown in FIG. 12. As with the curves shown in FIG. 4, these curves show the relationship between the amplitude of the input carrier color signal with the burst signal being maintained at a predetermined level and the amplitude of the output carrier color signal when the amplitude $E_Q$ of the carrier color signal is varied.

In the case of a prior art system in which the automatic chroma control circuit is controlled in response to the detected amplitude of the burst signal so that the burst signal can be maintained at a predetermined level, the amplitude of the input burst signal $E_B$ is kept constant so that the characteristic curve indicated by (a) in FIG. 12 is obtained. The characteristic curve (b) corresponds to that indicated by (e) in FIG. 4.

Next, the reasons why such characteristic curves can be obtained will be briefly described below. The output from the diode limiter as shown in FIG. 10 is $K_L \log (V_o+1)$, where $V_o$ is the output voltage at the output terminal 13 and $K_L$ is a constant of nonlinearity of the diode. The input $V_i$ and the output $V_o$ are correlated by the following equation (1):

$$V_i \cdot A \cdot [V_r - K_L \cdot \log (V_o+1)] = V_o$$

Hence, $$V_i = 1/A \cdot V_o/[V_r - K_L \cdot \log (V_o+1)] \quad (1)$$

For instance, when $A=20$, $V_r=1$ and $K_L=0.5$, the characteristic curve as indicated by (c) in FIG. 12 is obtained. It is readily seen that the smaller the carrier color signal, the more it is enhanced in recording. As a result, the signal-to-noise ratio can be improved and furthermore the equipment noise becomes negligible so that the signal-to-noise ratio can be further improved.

Although the nonlinearity constant $K_L$ has been described as having a constant value of 0.5, it is seen from FIG. 11A that it varies depending upon the current flowing through the diode. That is, the constant $K_L$ varies widely between the region in which the voltage $V_1$ increases with increase in the current $I_c$ as shown in FIG. 11A or in which the voltage $V_2$ becomes flat as shown in FIG. 11B and the other regions. In addition, the constant $K_L$ changes remarkably in the vicinity of the threshold value of the diode. Therefore, it follows that any desired characteristic curve can be obtained depending upon the diodes used and upon the value of the input voltage $V_1$ (See FIG. 11) in response to a reference signal. In selecting any desired characteristic curve, the peak of the carrier color signal must be about 2 to 3 dB below the point of $I_{c\ max}$ shown in FIG. 3 regardless of the contents of the carrier color signal.

Figure 13:
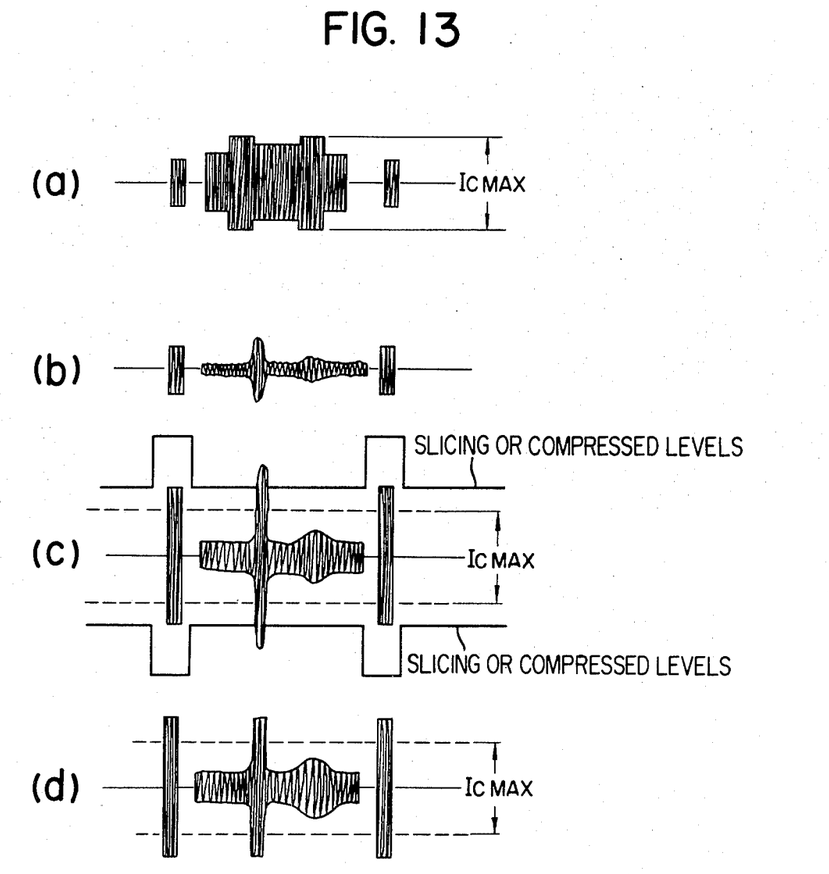
FIG. 13 shows the waveforms used for the explanation of the mode of operation of the second embodiment.

The effects of the first and second embodiments shown in FIGS. 5 and 9, respectively, can be enhanced further as will be decbied in detail below in conjunction with FIG. 13. FIG. 13, (a) shows the composite color signal at the output terminal 13 when the input signal is the color bar signal, the maximum amplitude corresponding to the maximum recording current $I_{c\ max}$.

FIG. 13, (b) shows the waveform of the composite color signal at the input terminal 11, the carrier color signal having relatively low amplitudes. Assume that in response to the input signal shown at (b), the signal as shown at (c) be derived from the output terminal 13, the output signal being enhanced by about 10 dB as compared with the input signal. Then the amplitudes of the burst signal and part of the carrier color signal exceed the amplitude corresponding to the maximum recording current $I_{c\ max}$. More specifically, the burst signal exceeds $I_{c\ max}$ by about 3 dB while part of the carrier color signal, by about 6 dB. Therefore, these signals are sliced or compressed at the levels indicated by solid lines at (c) in FIG. 13 between the frequency converter 8 and the output terminal 123 (See FIG. 5 or 9) during the period of the carrier color signal, the slicing or compressing level being about 3 dB higher than the positive and negative extremities of the maximum recording current $I_{c\ max}$. On the other hand, during the period of the burst, no slicing or compressing is effected or the slicing or compressing levels are increased. As a result, the signal as shown at (d) in FIG. 13 is obtained.

The sliced or compressed carrier color signal contains $f_s$ and its harmonics $2f_s$, $3f_s$ and so on. Assume that the carrier applied to the frequency converter 7 has a frequency of 4.2 MHz, then the output from the converter 7 includes the components at the frequencies of 0.62 MHz, 2.96 MHz, 6.5 MHz and so on. When this output passes through the low pass filter 9 with the upper limit of 1.2 MHz, the signal component only at the frequency of 0.62 MHz is derived. That is, the harmonics of the higher orders can be eliminated. As a result, a substantially sinusoidal waveform can be derived and the maximum amplitude of the carrier color signal is higher than that of the maximum recording current $I_{c\ max}$ by a predetermined level (about 3 dB in this example). Thus even when the maximum amplitude of the color carrier signal is set to a value a few dB higher than that of the maximum current $I_{c\ max}$, the carrier color signal can be recorded at the amplitude less than 2 to 3 dB higher than the maximum amplitude of the maximum recording current $I_{c\ max}$ by virtue of the insertion of a slicer or compressing circuit. As a result, the problem of intermodulation beats can be eliminated. The sliced or compressed carrier color signal is decreased in saturation, but it represents only a very small portion of a large picture so that no objectionable problem results. Furthermore, the adverse effects caused by the shooting of the amplitude of the burst signal beyond the maximum amplitude of the maximum recording current $I_{c\ max}$ can be eliminated when the characteristic curve shown by (b) in FIG. 3 is linear between $I_{c\ max}$ and $I_{cs}$. The reason is that even when the intermodulation beats are produced, they cannot be noticed on the picture because they occur during the blanking period.

Sometimes, depending upon the contents in the carrier color signal, the amplitude of the burst overshoots about 10 dB, but because of the insertion of the integrator 16, this circuit performs the average type function. As a result, the amplitude varies at an extremely slow speed so that no adverse effect results at all.

In summary, according to the present invention, as compared with the prior art burst type ACC, in the case of recording the amplitude of the carrier color signal is increased as high as possible by utilizing the nonlinear characteristic within the range in which no adverse effect results from intermodulation beats, whereby the signal-to-noise ratio S/N of the color signal can be remarkably improved.

Figure 14:
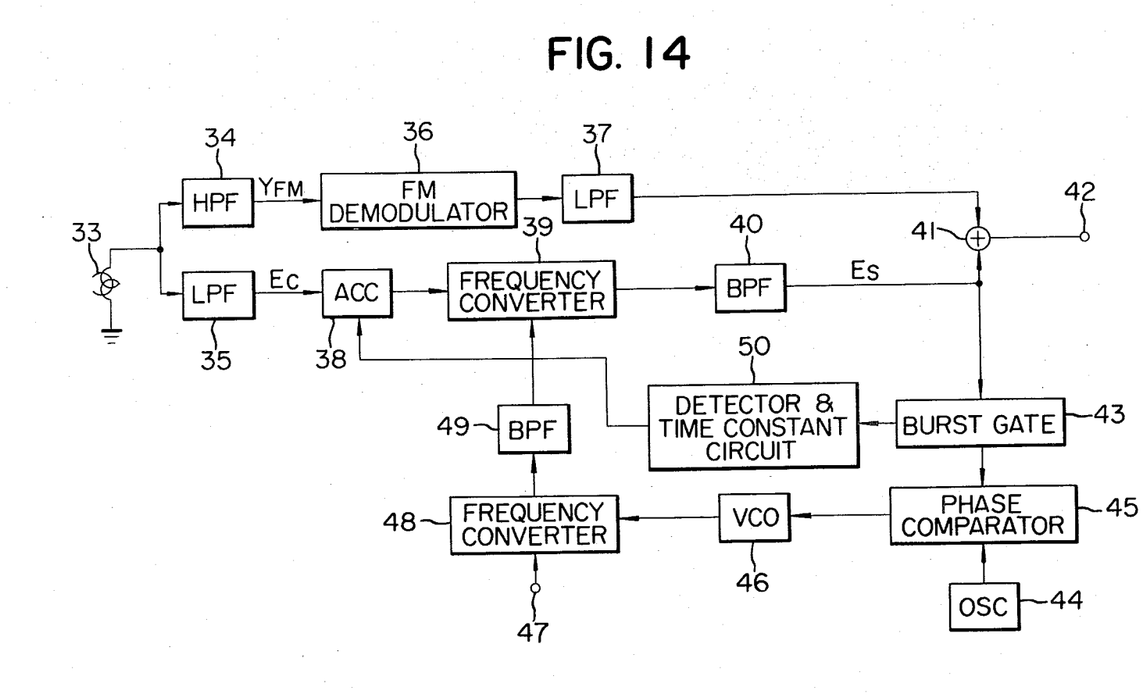
FIG. 14 is a block diagram of a reproduction system for reproducing the color video signal recorded in accordance with the present invention.

Next, a system for reproducing the signals thus recorded will be described in detail with reference to FIG. 14.

The recorded color video signal is picked up by a video head 33 and applied to both a high pass filter 34 and a low pass filter 35 so that the color video signal is separated into the luminance signal $Y_{FM}$ and the composite color signal $E_c$.

The luminance signal $Y_{FM}$ passes through a limiter, a demodulator 36 and a low-pass filter 37 so that the luminance signal $E_Y$ is reproduced.

The composite carrier color signal $E_c$ at the low frequencies passes through an automatic chroma control circuit 38, a converter 39 and a band pass filter 40 so that the original composite carrier color signal $E_s$ is reproduced. The reproduced luminance and composite carrier color signals are multiplexed in a multiplexer 41 and the multiplexed output signal is derived from an output terminal 42.

A continuous wave is applied from a band pass filter 49 to the frequency converter 39 in order to eliminate the variations in time axis of the composite carrier color signal $E_c$.

The continuous wave is produced as follows. The reproduced composite color signal $E_s$ is applied to a burst gate 43 so that the burst signal is separated and compared in phase with the signal from an oscillator 44 with a predetermined oscillating frequency in a comparator 45. In response to the error or difference signal from the comparator 45, a variable frequency oscillator 46 is controlled. The output signal from an automatic phase control circuit APC, consisting of these circuits 43, 44, 45 and 46, and the signal which is applied to an input terminal 47 and is in synchronism with the reproduced horizontal sync signal; that is, the output from an automatic frequency control circuit AFC, is frequency converted by a converter 48. By virtue of the continuous signal at a predetermined frequency derived from the band pass fiter 49, the variation in time axis of the composite carrier color signal reproduced by the frequency converter 39 is eliminated and the original frequency is restored.

The burst signal derived from the burst gate 43 is converted by an amplitude amplifier time constant circuit 50 into the automatic chroma gain control signal, in response to which the control circuit 38 is controlled in such a way that the amplitude of the output signal from the band pass filter 40 is maintained at a predetermined level.

According to the present invention, as described in detail elsewhere, the composite carrier color signal is enhanced with a relatively long time constant depending upon the amplitudes of both the burst signal and the carrier color signal before the composite carrier color signal is recorded. As a result, the amplitude of the burst signal is varied in response to said response in recording. In reproduction mode, the re-conversion can be easily carried out by virtue of the conventional automatic chroma control circuit 38 which maintains the amplitude of the burst signal at a predetermined level. When a time constant in response to which is controlled the automatic chroma control circuit 38 is so controlled as to be equal to or shorter than that used in recording, the response in recording can be covered in reproduction and the re-conversion can be performed very satisfactorily.

The reproduction can be carried out more satisfactorily as will be described below. As shown is FIG. 2(A), the ratio in amplitude between the burst signal and the red signal is equal to 1:2. As a result, when the composite carrier color signal is enhanced in amplitude by 10 to 12 dB when the small carrier color sgnal continuous for some time in recording, the burst signal exceeds beyond the amplitude of the red signal which corresponds to that of the recording current $I_{c\ max}$ by 4 to 6 dB. Then, the frequency-modulate luminance signal $Y_{FM}$ drops in level as shown in FIG. 3 so that the signal-to-noise ratio S/N of the luminance signal drops at a point and the intermodulation components are increased, resulting in the intermodulation component at $2f_c$ in the luminance signal reproduced during the period of the burst as indicated at ($a$) in FIG. 15. Because these intermodulation component and noise are generated during the horizontal blanking period, they will not appear in the reproduced picture, but cause some defects as will be described below. The reproduced composite carrier color signal $E_s$ which is derived from the band pass filter 40 and has a remarkably improved signal-to-noise ratio S/N is added in the multiplexer or adder 41 to the luminance signal (See ($a$) in FIG. 15) from the low pass filter 37. The reproduced color video signal is applied from the output terminal 42 to a color television set. The color television set includes an APC circuit so that the burst signal is extracted from the reproduced color video signal, and the continuous wave in phase with the extracted or separated burst signal is generated and used for detecting the carrier color signal. However, the noise in the luminance signal and the intermodulation components are mixed with the separated burst signal so that variations in hue and saturations result. According to the present invention, however, this problem can be also overcome as will be described in detail with reference to FIG. 16.

Figure 16:
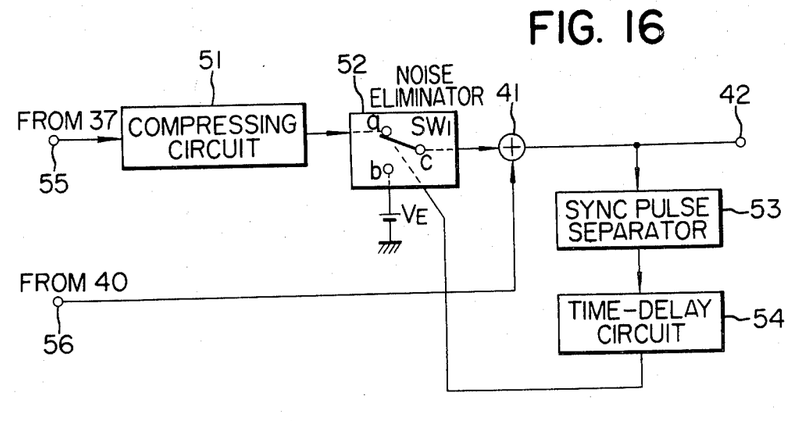
FIG. 16 is a circuit diagram of the noise eliminating device which can considerably enhance the effects of the present invention.

Referring to FIG. 16, the reproduced luminance signal is applied from the low pass filter 37 to an input terminal 55 and is compressed by a compressing circuit 51 at the level of sync pulses or at a pedestal level so that the DC component is restored. Thereafter, the luminance signal is applied to a noise eliminator 52 so that the noise and intermodulation components in the luminance signal during the period of the burst signal are eliminated. The output from the eliminator 52 is added in the multiplexer 41 with the composite carrier color signal which is applied to an input terminal 56 from the band pass filter 41 and which has a high signal-to-noise ratio S/N. The color video signal is applied from the output terminal 42 to a color television set as described elsewhere.

Figure 15:
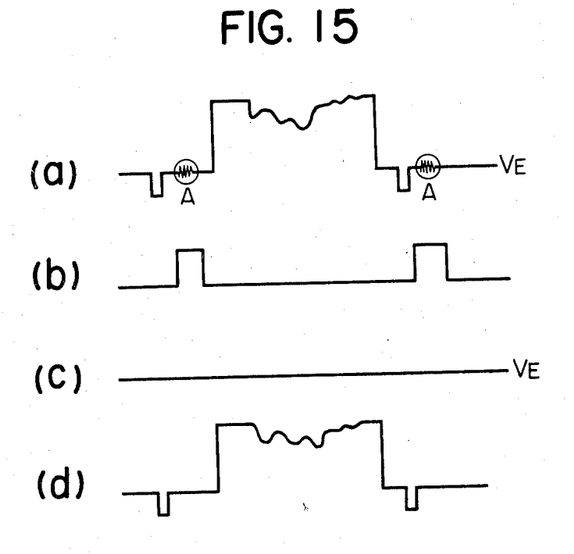
FIG. 15 shows the waveforms used for the explanation of a noise eliminating device shown in FIG. 16.

Next, the construction and effects of the noise eliminator 52 will be described in detail. The signal as shown at ($a$) in FIG. 15 is applied to the input of the noise eliminator 52 which in turn is connected to a stationary contact $a$ of a switch $SW_1$. Another stationary contact $b$ is connected to a DC voltage source $V_E$ as shown at ($c$) in FIG. 15. A movable contact c is the output of the noise eliminator 52.

Meanwhile, the horizontal sync pulses are extracted from the reproduced video signal by a sync pulse separator 53 and applied to a time-delay circuit 54 so that the time-delayed signal as shown at (b) in FIG. 15 is derived. In response to this signal (b), the movable contact c of the switch $SW_1$ is contacted with the stationary contact b only during the period of the burst signal, but except for this period the movable contact c is kept in contact with the stationary contact a. As a result, there is derived from the noise eliminator 52 is the output which, as shown at (d) in FIG. 15, is free from noise and intermodulation distortions (See ($a$) in FIG. 15). This system ensures the normal function of the automatic phase control circuit in a television set.

The automatic chroma control circuit (See FIGS. 5 and 9) can be inserted at any suitable point in the path from the band pass filter 3 to the multiplexer 5 (See FIG. 1). In addition, instead of the negative feedback type as shown in FIG. 5, an open loop can be used in which the composite carrier color signal is utilized before it is applied to the amplifier 12.

So far the present invention has been described in conjunction with the system in which the composite carrier color signal is shifted to a lower frequency range, but it is to be understood that the present invention is not limited to this system alone and that the present invention can be equally applied to any system in which the luminance signal and the composite carrier color signal are processed independently of each other. For instance, it may be the so-called periodic chromatic system in which the composite carrier color signal is shifted from its original frequency of 3.58 MHz to a lower frequency range from 1 to 3 MHz in which the relationship $(2n+1)/2\ f_H$ must be held, where n is an integer and $f_H$ is a horizontal line scanning frequency; the frequency-shifted composite carrier color signal is interleaved with the luminance signal; and the interleaved signal is then subjected to the angle modulation and recorded. The present invention can be further applied to a system in which the composite carrier color signal is shifted to a lower frequency range and recorded in such a way that the frequencies of the composite carrier color signal are interleaved between the adjacent tracks. This system is known as "VHS" and β-Format systems, both being trademarks.

Instead of the nonlinear circuit 32 as shown in FIG. 10, any other suitable circuits may be employed. Furthermore, the integrator 16 can be so designed and constructed that its DC voltage characteristic curve has a flex point.

So far the present invention has been described in conjunction with the simplest video signal recording and reproducing system in order to reduce the production cost as much as possible and to attain a high signal-to-noise ratio S/N, but it is to be understood that the present invention can be applied to a system in which a burst type automatic chroma gain control circuit is provided which can compensate for the control characteristics of the prior art and which maintains the amplitudes of the composite carrier color signal at a predetermined level before the composite carrier color signal is applied to the automatic chroma control circuit as shown in FIG. 5 or 9. Furthermore, in the second embodiment, the converter 14 (See FIG. 5) can be connected to the output of the nonlinear circuit 32 shown in FIG. 9.

In summary, according to the present invention, the composite carrier color signal which is separated from the color video signal is shifted to a desired low frequency range. The frequency-shifted composite carrier color signal is then applied to a variable-gain amplifier and the output of the amplifier is applied to a nonlinear circuit 32 or a converter 14 and amplitude detected by a detector 15. In response to the output from the detector 15, the variable-gain amplifier 12 is controlled, whereby the characteristic curves as shown at (b) and (c) in FIG. 12 can be obtained. As a result, as compared with the prior art burst type ACC, the smaller the signal, the higher the amplitude of the composite carrier color signal becomes. In other words, the recording current is varied in response to the information obtained by the integration for a predetermined time period of the input composite carrier color signal.

As a result, the amplitude of the carrier color signal in the conventional color video signal can be made smaller than that of the color bar signal by from ten to twenty decibels as an average so that the signal-to-noise ratio S/N can be remarkably improved. In addition, the carrier color signal with low amplitudes can be recorded at high levels so that the reproduced equipment noise will not adversely affect the reproduction. Furthermore, the problem of cross color can be also substantially overcomed. As a result, the high density recording utilizing the short wavelengths or narrow tracks become feasible. Moreover, since the nonlinear circuit 32 or the converter 14 is not inserted into the main signal transmission line, no adverse effect on the composite carrier color signal will occur.

For instance, when the present invention is applied to a VTR system using a recording tape which has a track width of 29 microns and is transported at a relative velocity of 5.8 m/sec and when the carrier color signal whose amplitude is −20 dB based upon the maximum amplitude of 0 dB of the carrier color signal of the color bar signal is recorded and reproduced, the AM and PM noise can be improved by about 10 dB as compared with the system in which a prior art burst type ACC is used.

What is claimed is:

1. A color video signal recording and reproducing apparatus of the type in which the luminance signal and the composite carrier color signal, including a carrier color signal component and a color burst signal component, are separated from the color video signal; the separated composite carrier color signal and the separated luminance signal are processed for recording on a recording medium by a transducer; and the transmission circuit for coupling the separated composite carrier color signal to the transducer includes a variable gain control circuit responsive to a gain control signal for providing an optimum recording current at a maximum amplitude of the composite carrier color signal, said apparatus comprising:

first means for amplitude detecting the composite carrier color signal;

second means coupled to said first means for modifying the output of said first means by enhancing the amplitude of said color burst signal component of said composite carrier color signal relative to the carrier color signal component thereof;

third means for integrating the output of said first means to provide a varying DC voltage; and means for comparing said DC voltage to a reference voltage to provide said grain control signal, so that the amplitude of the composite carrier color signal is enhanced when the amplitude of the carrier color signal component thereof is less than a predetermined maximum value.

2. The apparatus according to claim 1, wherein said second means comprises a converter responsive to said color burst signal component.

3. A color video signal recording and reproducing apparatus as set forth in claim 2, wherein the ratio $E_Q/E_B$ in amplitude between the carrier color signal component and the color burst signal component, where $E_Q$ is the amplitude of the color carrier signal component and $E_B$ is the amplitude of the color burst signal component, is made smaller than the ratio in amplitude between the carrier color signal component and the color burst signal component before they are applied to said converter.

4. A color video signal recording and reproducing apparatus as set forth in claim 1, wherein said second means comprises a nonlinear circuit for compressing the amplitude of the composite carrier color signal in inverse relation to the level thereof, so that the greater the amplitude of the composite carrier color signal, the more said amplitude is compressed.

5. A color video signal recording and reproducing apparatus as set forth in claim 4, wherein said nonlinear circuit is inserted between said separated composite carrier color signal and said first means.

6. A color video signal recording and reproducing apparatus as set forth in claim 1, further comprising fourth means for slicing or compressing the amplitude of the carrier color signal component of the composite carrier color signal transmitted through said transmission circuit in such a way that the amplitude of the carrier color signal component is equal to or less than a given level higher than a desired threshold level.

7. The apparatus according to claim 1, further comprising:

means for shifting said composite carrier color signal in frequency prior to applying the same to said transducer;

means for reproducing said composite carrier color signal, at the original frequency thereof, and said luminance signal from said recording medium;

means for combining the reproduced composite carrier color signal and luminance signal to provide a reproduced color video signal;

a second variable gain control circuit for controlling the amplitude of the reproduced color video signal;

burst separating and second amplitude detecting means for separating the color burst signal component from the reproduced composite carrier color signal and detecting the amplitude of the separated burst; and amplitude control means coupled to said burst separating and amplitude detecting means for controlling said second variable gain control circuit in response to the output from said second amplitude detecting means to maintain the amplitude of the color burst signal component at a desired level.

8. A color video signal recording and reproducing apparatus as set forth in claim 7, further comprising a circuit for suppressing noise in the reproduced luminance signal during each occurrence of the color burst signal component.

* * * * *

UNITED STATES PATENT AND TRADEMARK OFFICE
CERTIFICATE OF CORRECTION

PATENT NO. : 4,356,506
DATED : October 26, 1982
INVENTOR(S) : Chojuro Yamamitsu

It is certified that error appears in the above-identified patent and that said Letters Patent is hereby corrected as shown below:

In [22] 2nd priority date should be --February 25, 1980.--

Column 8, line 58: "decbied" should be --described--

Column 10, line 36: "fiter" should be --filter--

Column 13, line 14: "comed" should be --come--

Signed and Sealed this

Sixth Day of December 1983

[SEAL]

Attest:

GERALD J. MOSSINGHOFF

Attesting Officer   Commissioner of Patents and Trademarks